United States Patent [19]

Loges et al.

[11] Patent Number: 5,319,775
[45] Date of Patent: Jun. 7, 1994

[54] CENTRALIZED DIAGNOSTIC SYSTEM FOR LOOSELY COUPLED PROCESSORS

[75] Inventors: Barry L. Loges; Graciela B. Sholander, both of San Diego, Calif.

[73] Assignee: NCR Corporation, Dayton, Ohio

[21] Appl. No.: 733,772

[22] Filed: Jul. 22, 1991

[51] Int. Cl.⁵ .................................. G06F 11/16
[52] U.S. Cl. ........................................ 395/575
[58] Field of Search .............. 371/16.1, 18; 395/575

[56] References Cited

U.S. PATENT DOCUMENTS

| | | | |
|---|---|---|---|
| 4,325,120 | 4/1982 | Colley et al. | 364/200 |
| 4,354,225 | 10/1982 | Friedler et al. | 395/375 |
| 4,408,273 | 10/1983 | Plow | 364/200 |
| 4,627,055 | 12/1986 | Mori et al. | 371/16 |
| 4,636,939 | 1/1987 | Fildes | 364/200 |
| 4,654,819 | 3/1987 | Stiffler et al. | 364/900 |
| 4,677,588 | 6/1987 | Benjamin et al. | 364/900 |
| 4,718,002 | 1/1988 | Carr | 364/200 |
| 4,777,595 | 10/1988 | Strecker et al. | 364/200 |
| 4,866,664 | 9/1989 | Burkhardt, Jr. et al. | 364/900 |
| 4,870,638 | 9/1989 | Kawano et al. | 370/13 |
| 4,872,165 | 10/1989 | Mori et al. | 371/11.2 |
| 5,163,052 | 11/1992 | Evans et al. | 371/18 |

Primary Examiner—Charles E. Atkinson
Attorney, Agent, or Firm—James M. Stover

[57] ABSTRACT

A diagnostic system for a large, multiple processor data processing system. Diagnostic access between dual diagnostic intelligent consoles and each processor is provided through a diagnostic network of communication links and switching nodes which are independent of normal data processing system communication channels. The diagnostic network consists of two embedded three structure communication networks providing two different diagnostic communication paths to each processor within the data processing system.

11 Claims, 4 Drawing Sheets

CENTRALIZED DIAGNOSTIC SYSTEM FOR LOOSELY COUPLED PROCESSORS

This present invention relates to data processing system and, more particularly, to a diagnostic system for servicing a large multiple processor system.

BACKGROUND OF THE INVENTION

The ability to detect processor or subsystem faults within a multiple processor data processing system is essential to prevent the corruption of data or the malfunction of other components within the data processing system. Several fault diagnostic methods for use in multiple processor data processing systems are known in the art. Fault detection systems are described, for example, in "Decentralized Processing Method and System", Mori et al., U.S. Pat. No. 4,627,055, issued Dec. 2, 1986; "Remote Maintenance System for a Digital Communication Network", Kawano et al., U.S. Pat. No. 4,870,638, issued Sep. 26, 1989; and "Fault Diagnostic Distributed Processing Method and System", Mori et. al., U.S. Pat. No. 4,872,165, issued Oct. 3, 1989.

U.S. Pat. Nos. 4,627,055 and 4,872,165 each disclose distributed processing systems including a plurality of subsystems connected into a loop transmission system. Each subsystem has diagnostic means for identifying faults in other subsystems and on the network by placing messages onto the loop and monitoring the return to the messages. One disadvantage of the described system is that diagnostic operations interfere with other network operations.

U.S. Pat. No. 4,870,638 shows a digital communication network comprising a central toll center (TC) and several local switching offices (LOs), each LO being connected directly to the toll center by digital transmission lines. A central maintenance and operation center (CMOC) located at the toll center diagnoses alarm signals received from the LOs and sends maintenance signals for repairing identified faults to the LOs. Communication between the CMOC and the LOs can be accommodated by a system of dedicated data lines, by a sharing of the digital transmission lines which connect the LOs with the TC, or through the use of both the digital transmission lines and dedicated data lines. Diagnostic systems utilizing the digital transmission lines to communicate with the LOs are disadvantaged in that non-diagnostic communicates between the TC and LOs may be impaired during diagnostic operations. The system shown which utilizes a dedicated network of data lines for diagnostic communications does not provide redundant diagnostic communication paths as provided in the system employing both digital transmission lines and dedicated data lines or in the loop systems described in U.S. Pat. Nos. 4,627,055 and 4,872,165.

A diagnostic system in which diagnostic access to individual processors within a multiple processor system is provided though a redundant network of communication links independent of normal communication channels has been proposed to obviate the above-described problems.

OBJECTS OF THE INVENTION

It is therefore an object of the present invention to provide a new and useful diagnostic system for servicing a multiple processor system.

It is an additional object of the present invention to provide such a diagnostic system which reduces the need for on-site service personnel.

It is another object of the present invention to provide a new and useful diagnostic system for a multiple processor data processing system which permits concurrent operation of diagnostic and non-diagnostic operations with little or no impact on processing system performance.

It is yet another object of the present invention to provide a new and useful centralized diagnostic system for a multiple processor data processing system providing remote and local diagnostic access to individual processors through an independent network of diagnostic communication links.

It is still a further object of the present invention to provide a fault tolerant diagnostic system providing multiple path diagnostic access to individual processors within a data processing system.

SUMMARY OF THE INVENTION

There is provided, in accordance with the present invention, a diagnostic system for data processing system having a plurality of processors and data links interconnecting the processors. The diagnostic system includes a first intelligent diagnostic console for generating and receiving diagnostic messages and a network of diagnostic communication links connecting the intelligent console with each one of the data processing system processors such that at least one communication path is provided between the diagnostic console and each processor. The diagnostic communication links are dedicated to diagnostic operations and are independent of the data links which interconnect the data processing system processors.

In the described embodiment, the diagnostic network comprises a tree network including a plurality of switching nodes interconnected by diagnostic communication links. Each switching node is also connected through diagnostic communication links with a group of data processing system processors to form a cluster.

Diagnostic messages are transmitted between the intelligent console, the switching nodes and processors within the clusters utilizing a message packeting protocol. The intelligent console and processors each include the ability to generate a diagnostic message packet. The switching nodes each include a control processor and memory containing control software for reading and routing diagnostic message packets through the network.

The diagnostic system is made fault tolerant through the addition of a second intelligent console and additional diagnostic communication links forming a second tree network connecting the second intelligent console with each processor. Thus, two independent communication paths are provided to each processor.

The above objects and other objects, features, and advantages of the present invention will become apparent from the following detailed specification when read in conjunction with the accompanying drawings in which applicable reference numerals have been carried forward.

DETAILED DESCRIPTION OF THE PREFERRED EMBODIMENT

Figure 1:
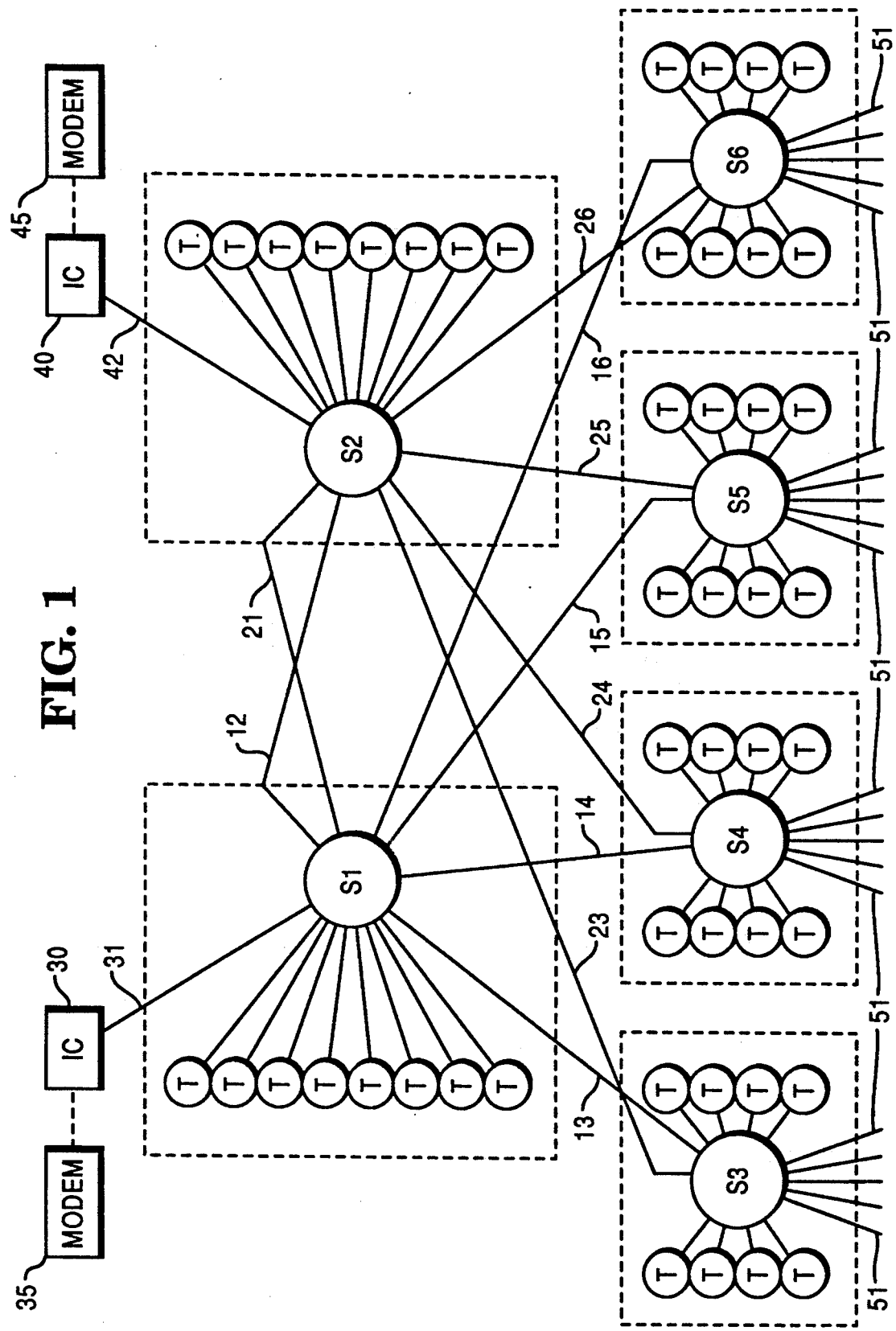
FIG. 1 diagramatically illustrates one embodiment of a diagnostic network constructed in accordance with the present invention.

The diagnostic system shown in the drawings and described herein consists of three interrelated functional parts: the diagnostic network, the diagnostic control processor and the cluster diagnostic console. Each of these elements will be discussed in detail below.

The first two levels of the diagnostic network are illustrated diagramatically in FIG. 1. The network shown includes six switching nodes, identified by reference numerals S1 through S6, interconnected by communication links 12 through 16, 21, and 23 through 25. The switching nodes are each connected with up to eight target processors, shown as small circles marked with the reference letter T, to form a cluster. Each of the six clusters are represented in FIG. 1 by broken lines enclosing a switching node and the target processors connected thereto.

Switching nodes S1 and S2 are each connected through communication links 31 and 42 to intelligent consoles (ICs) 30 and 40, respectively, which provide local operator access to the diagnostic network. Remote access to the network may be provided by connecting intelligent cosoles 30 and 40 with modems 35 and 45, respectively.

A two-level, redundant, tree structure is shown in FIG. 1. The first level consists of the node S1 cluster for the primary tree and the node S2 cluster for the secondary tree; the second level includes the clusters associated with nodes S3 through S6. As will be explained in greater detail below, node S2 and S1 clusters are also included in the second level of the primary and secondary tree structures, respectively. Each node in the first two levels of the network can be accessed through two unique paths through the diagnostic network. For example, node S5 can be accessed from IC 30 via communication link 31, switching node S1 and link 15; or from IC 40 through communication link 42, switching node S2 and link 25. The diagnostic network may contain additional levels beyond the two levels shown. However, redundant paths are provided only through the first two levels of the network. Communication links 51, emanating from nodes S3 through S6, connect with respective clusters (not shown) which form a third level of the diagnostic network. In a similar manner, additional levels of clusters can be attached to the level-three clusters.

Figure 2:
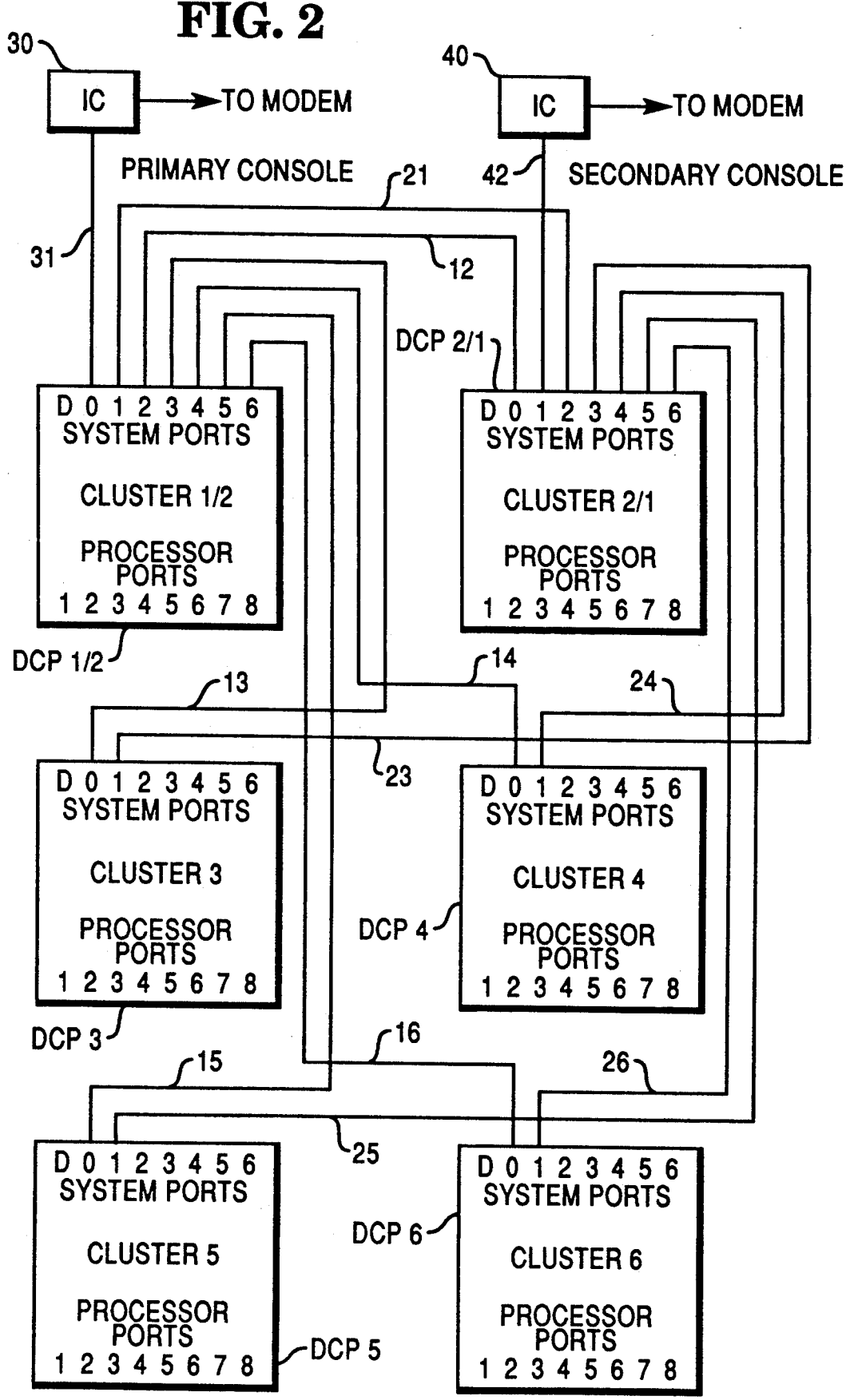
FIG. 2 is a block diagram illustrating the connection of diagnostic communication links between diagnostic control processors located at the switching nodes shown in FIG. 1.

The structure of switching nodes S1 through S2 and the connection of communication links between the nodes is illustrated in greater detail in the block diagram of FIG. 2. A diagnostic control processor (DCP) forms the central hardware element of each one of switching nodes S1 through S6. The processors corresponding to nodes S1 through S6 are labeled DCP 1/2, DCP 2/1 and DCP 3 through DCP 6, respectively. Each diagnostic control processor includes seven system ports labeled 0 through 6 for supporting system or inter-cluster links, eight processor ports labeled 0 through 7 for connection with target processors and a diagnostic port D which provides a console for direct diagnostic input. Additional detail concerning the internal construction and operation of the diagnostic control processors is provided in FIG. 5 and the text which accompanies FIG. 5.

Connections between the diagnostic control processors are as follows:

| System Port | Connection |
|---|---|
| | Processor DCP 1/2 |
| 0 | Primary IC 30 via link 31 |
| 1 | System port 2 of DCP 2/1 via link 21 |
| 2 | System port 0 of DCP 2/1 via link 12 |
| 3 | System port 0 of DCP 3 via link 13 |
| 4 | System port 0 of DCP 4 via link 14 |
| 5 | System port 0 of DCP 5 via link 15 |
| 6 | System port 0 of DCP 6 via link 16 |
| | Processor DCP 2/1 |
| 0 | System port 2 of DCP 1/2 via link 12 |
| 1 | Primary IC 40 via link 42 |
| 2 | System port 1 of DCP 1/2 via link 21 |
| 3 | System port 1 of DCP 3 via link 23 |
| 4 | System port 1 of DCP 4 via link 24 |
| 5 | System port 1 of DCP 5 via link 25 |
| 6 | System port 1 of DCP 6 via link 26 |
| | Processor DCP 3 through DCP 6 |
| 0 | Processor DCP 1/2 via respective link |
| 1 | Processor DCP 2/1 via respective link |
| 2 | Next level processor - if provided |
| 3 | Next level processor - if provided |
| 4 | Next level processor - if provided |
| 5 | Next level processor - if provided |
| 6 | Next level processor - if provided |

Figure 3:
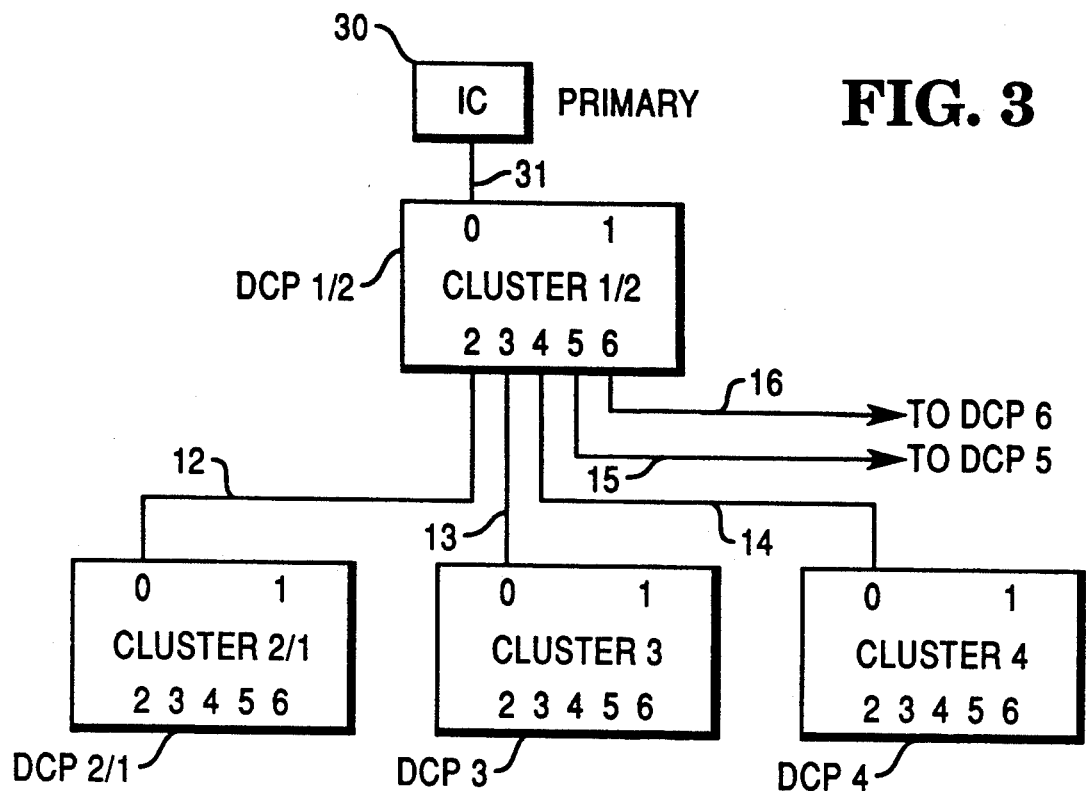
FIG. 3 is a block diagram illustration of the primary diagnostic tree network included within the system of FIGS. 1 and 2.
Figure 4:
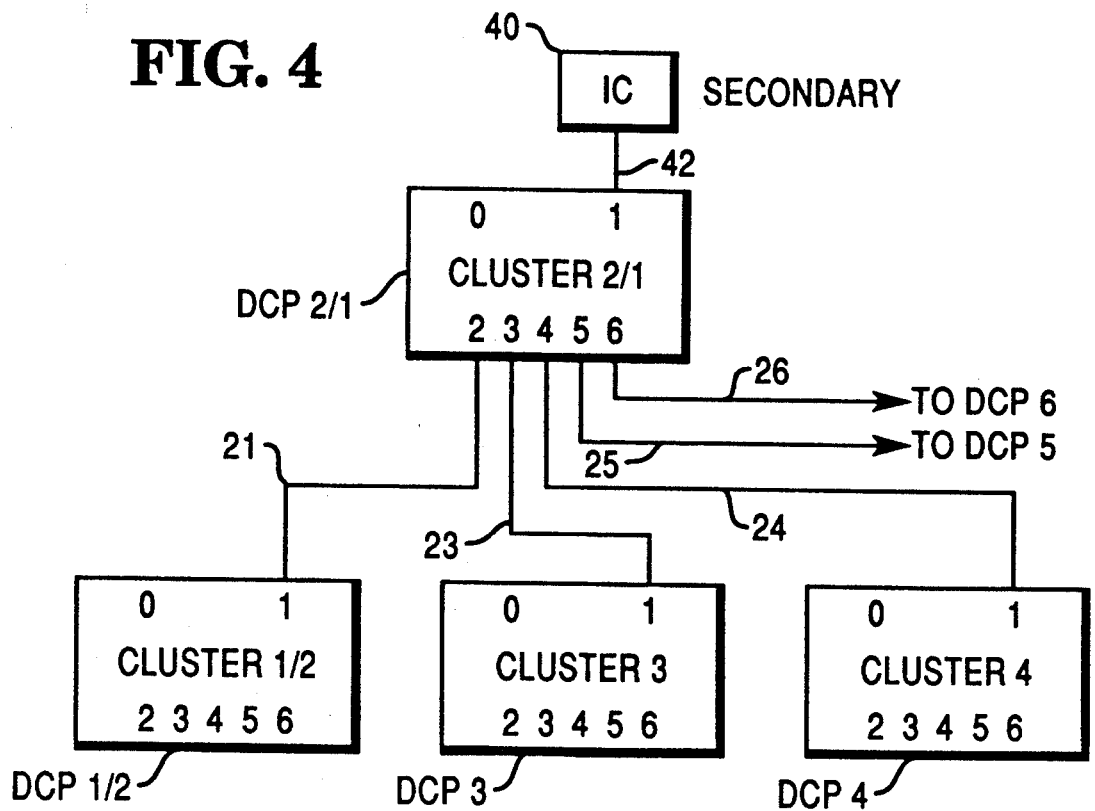
FIG. 4 is a block diagram illustration of the secondary diagnostic tree network included within the system of FIGS. 1 and 2.

As stated earlier, the diagnostic network includes a dual tree structure throughout the first two levels of the network, providing two communication paths to each processor in the system. The dual diagnostic tree networks are illustrated in FIGS. 3 and 4. FIG. 3 shows the primary diagnostic tree, while FIG. 4 shows the secondary diagnostic tree.

Figure 5:
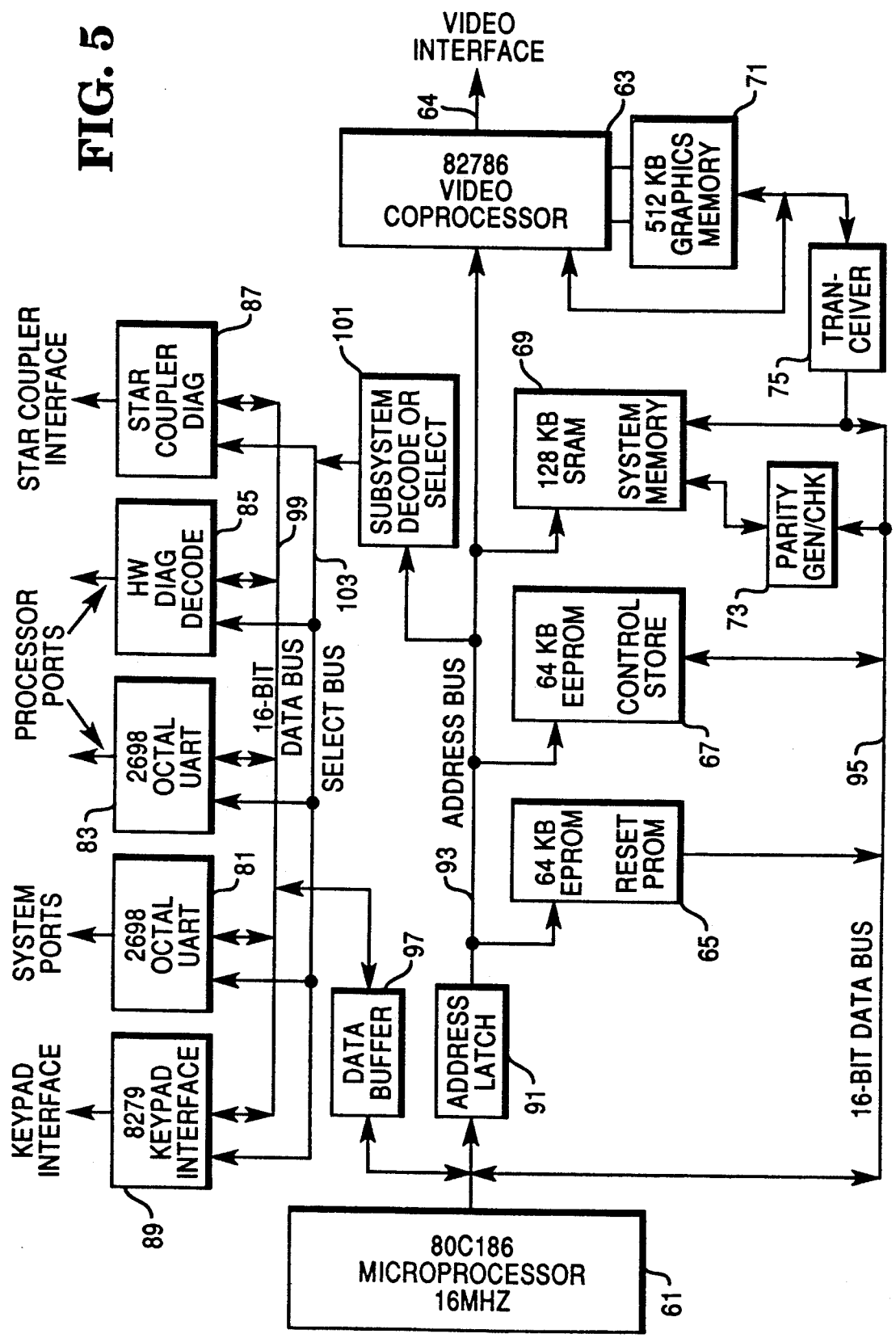
FIG. 5 illustrates in block diagram form the construction of the diagnostic control processors shown in FIGS. 2 through 4.

FIG. 5 provides a functional block diagram illustration of the internal construction of the diagnostic control processors located at the network switching nodes. The control processor utilizes a standard, "off-the-shelf", microprocessor and graphics coprocessor along with several other LSI (large scale integrated) devices to implement required functionality. The major functional components within the control processor illustrated are:

80C186 16-bit, 16 MHz microprocessor (61)
82786 8 MHz graphics coprocessor (63)
64 KB reset memory (65)
64 KB control store memory (67)
128 KB system memory (69)
512 KB graphics memory (71)
2698 octal-UART for eight processor links (81)
2698 octal-UART for seven system links and a control processor diagnostic link (83)
Video interface (64)
Keypad interface (89)
Hardwire diagnostic decode/interface (85)
Star coupler diagnostic control/interface (87)

The various memory and interface devices listed above are interconnected in a conventional manner with microprocessor 61 and graphics coprocessor 63 by address busses 93 and 103 and data busses 95 and 99.

Microprocessor 61 forms the heart of the diagnostic control processor, controlling the configuration of 2698 octal-UARTs 83 and 85, receiving and decoding messages directed to the control processor, receiving and redirecting messages addressed to other diagnostic control processors, and generating and transmitting diagnostic commands. Additional functions include generation and maintenance of a local diagnostic bus configuration table describing system and processor port connections, and generation and maintenance of diagnostic tables containing status and error information for remote diagnostic control processors.

Graphics coprocessor 63 generates and maintains screens to be displayed on a display monitor (not shown) connected through video interface 64. The coprocessor provides all the control signals required to operate a color monitor.

Four memories are included in the diagnostic control processor, each performing a unique function. Reset memory 65 is a nonvolatile memory containing instructions which provide boot tasks, hardware testing, hardware initialization, instruction download, and the basic RS-232C driver.

Control store memory 67 is a non-volatile memory functioning primarily as an extension of reset memory 65 containing instructions which provide all of the control processor functions not included in the reset memory. These functions may include maintenance display and control, activity display, and a coprocessor driver.

System memory 69 is a volatile memory providing primary data storage for ongoing operations. System memory 69 provides storage for diagnostic messages, processor error displays, configuration tables and other control store required data. The graphics memory 71 is a volatile storage area for graphics screens, graphics font tables and graphics commands.

The 2698 octal-UARTs (Universal Asynchronous Receiver-Transmitter) 81 and 83 each provide serial communication between processor 61 and up to eight external devices. Seven of the ports provided by receiver-transmitter 81 connect with other control processors or one of the primary or secondary intelligent consoles 30 or 40. The remaining port provided by octal-UART 83 is for a console input to the control processor to allow direct diagnostic input. The communication ports provided by receiver-transmitter 83 connect with up to eight target processors within a cluster. The communication links (12-16, 21 23-26, 31, 42 and 51) connecting the control processor with other control processors, target processors and intelligent consoles are provided by standard RS-232C cables.

Video interface 64 is directly driven from graphics coprocessor 63. A nine pin D shell connector is provided to support the eight control signals plus a ground connection required to drive a CRT. Keyboard interface 89 provides an interface between a six switch keypad (not shown) and microprocessor 61. Through the keyboard and CRT, a local operator can perform diagnostics on the control processor or any processor within the local cluster.

Hardwire diagnostic decode/interface 85 provides an eight wire connection to each target processor within the cluster for hardwire maintenance functions. The decode/interface contains logic which converts write commands from microprocessor 61 into hardwire control signals for each target processor.

Star coupler diagnostic control/interface 87 provides a 16 wire hardware connection to the system interconnect network, i.e. the normal interconnect for the system, to assist in diagnostic operations.

Two types of physical links between elements within the diagnostic network have been identified above. The first link is between switching nodes (e.g. between control processors) or between a switching node and an intelligent console. This link is composed of a standard nine pin subset of the RS-232 communication protocol. The second link is between switching nodes and their connected target processors. This link consists of a standard nine pin subset of the RS-232 communication protocol along with one or more additional wires providing diagnostic commands directly to the target processors.

The diagnostic network is structured to provide three bidirectional communication paths. These paths are: intelligent console to switching node, intelligent console to target processor, and target processor to switching node. This limited set of paths is easily accommodated by a simple packet switching protocol described below.

Messages conducted along the diagnostic network are composed of variable length message packets. Each packet includes a header which directs the message to the correct destination and specifies the message length. To support the two level diagnostic tree shown in FIG. 1 through 4, a six ASCII character field is utilized. The first two characters are "ESC d", which indicate the start of a new message packet. The second two characters provide a routing address and the last two characters specify the length of the packet. The remainder of the packet comprises the message body.

The routing address includes a cluster destination field and a processor destination field. For the network shown in FIG. 1, the cluster destination field can contain any ASCII character from 0 through 6. All target processor originated messages include a cluster destination of 0. Messages originating with an intelligent console include a cluster destination of 1 through 6. A switching node, after receiving a complete packet from the intelligent console, inspects the cluster destination field. If the cluster destination field contains a 0 or 1, the switching node examines the processor destination field. If the cluster destination field contains a 2, 3, 4, 5, or 6, the switching node changes the field value to 1 and retransmits the modified message packet to the appropriate switching node. Changing the cluster destination field value to 1 identifies the next switching node as the final cluster destination.

The processor destination field specifies the destination device. This device may be one of eight target processors supported by a switching node, an intelligent console, or the switching node processor. Messages originated by a target processor may select only the local switching node or an intelligent console as a destination. If the switching node is selected, the node's diagnostic control processor decodes and executes the message as received. If an intelligent console is selected, the switching node transmits the message up the diagnostic tree to the intelligent console. In the dual tree structure shown in the figures, only one tree may be active at a time. The switching node maintains in memory a pointer to the active intelligent console. If a message packet includes a processor destination field which specifies a target processor, the switching node removes the header and transmits the body of the message to the specified target processor.

As described above, the diagnostic network requires only minimal intelligence within the switching network nodes. Path direction is simply a physical port selection determined from a reading of header fields. No knowledge of the devices being accessed is required by the switching nodes. Each switching node's diagnostic control processor, through onboard, permanently resident controlware, provides for packet switching and message execution.

The target processors also require no knowledge of the diagnostic network or of the devices residing on the network. The only intelligence required by the target processors is the ability created two types of headers, specifying the intelligent console or switching node as destination.

A goal of the present invention is to place most of the diagnostic intelligence into a single device, i.e. the intelligent console, rather than distributing the intelligence throughout the network. The intelligent console is the only device in the network which requires complete knowledge of the network, such as the location and physical routing to each element within the diagnostic network. The switching nodes and target processors contain only the intelligence to communicate on a RS-232 link and to specify a destination in a message packet.

The intelligent console includes the intelligence to query the diagnostic system and build a configuration table which identifies each device in the network and the physical route to access each device. The intelligent console constructs a network configuration table by reading the local configuration tables for each switching node. Once the physical network has been established, the intelligent console can query each target processor to obtain information such as processor type, processor ID, and other relevant information.

It can thus be seen that there has been provided by the present invention a diagnostic system for a multiple processor data processing system which permits concurrent operation of diagnostic and nondiagnostic operations with little or no impact on processing system performance. Concurrent operation is provided through an independent network of diagnostic communication links. Fault tolerance is also provided by having multiple path diagnostic access to the individual processors within the data processing system.

Although the presently preferred embodiment of the invention has been described, it will be understood that various changes may be made within the scope of the appended claims. For example, the diagnostic system may include a greater or lessor number of processors than shown and additional levels of processors. The construction of the control processor shown in FIG. 5 is exemplary only as other components and arranged of components providing the same functionality are possible.

These and other variations, changes, substitution and equivalents will be readily apparent to those skilled in the art without departing from the spirit and scope of the present invention. Accordingly, it is intended that the invention to be secured by Letters Patent be limited only by the scope of the appended claims.

What is claimed is:

1. A diagnostic system for a data processing system having a plurality of processors and data links interconnecting said processors, the diagnostic system comprising:

a first intelligent diagnostic console for transmitting diagnostic commands and receiving diagnostic information; and a network of diagnostic communication links connecting said intelligent console with each one of said plurality of processors and providing at least one communication path between said diagnostic console and each one of said plurality of processors, said diagnostic communication links being independent of said data links;

wherein said network comprises a tree network including a plurality of switching nodes interconnected by said diagnostic communication links; and wherein each one of said plurality of processors is connected through a corresponding one of said communication links to one of said plurality of switching nodes.

2. The diagnostic system in accordance with claim 1, wherein diagnostic messages are transmitted between said intelligent console, said switching nodes and said processors utilizing a message packeting protocol.

3. The diagnostic system in accordance with claim 2, wherein:

said intelligent console and each one of said processors include means for generating a diagnostic message packet; and each one of said switching nodes comprises a control processor and memory containing control software for reading and routing diagnostic message packets.

4. A diagnostic system for a data processing system having a plurality of processors and data links interconnecting said processors, the diagnostic system comprising:

a first intelligent diagnostic console for transmitting diagnostic commands and receiving diagnostic information; and a network of diagnostic communication links connecting said intelligent console with each one of said plurality of processors and providing at least one communication path between said diagnostic console and each one of said plurality of processors, said diagnostic communication links being independent of said data links;

wherein said network comprises a dual tree network including a plurality of switching nodes interconnected by said diagnostic communication links whereby said first intelligent controller connects with each one of said switching nodes through a first tree structure and said second intelligent controller connects with each one of said switching nodes through a second tree structure; and wherein each one of said plurality of processors is connected through a corresponding one of said communication links to one of said plurality of switching nodes.

5. The diagnostic system in accordance with claim 4, wherein diagnostic messages are transmitted between said intelligent controller, said switching nodes and said processors utilizing a message packeting protocol.

6. The diagnostic system in accordance with claim 5, wherein:

said intelligent console and each one of said processors include means for generating a diagnostic message packet; and each one of said switching nodes comprises a control processor and memory containing control software for reading and routing diagnostic message packets.

7. A diagnostic system for a data processing system having a plurality of processors and data links interconnecting said processors, the diagnostic system comprising:
   a first intelligent diagnostic console for transmitting diagnostic commands and receiving diagnostic information; and
   a first-level switching node connected by a dedicated diagnostic communication link to said intelligent console; and
   a plurality of second-level switching nodes, each one of said second-level switching nodes being connected by a corresponding dedicated diagnostic communication link with said first-level switching node;
   each one of said switching nodes being connected to a group of said processors by corresponding dedicated diagnostic communication links, each one of said groups of processors being a subset of said plurality of processors;
   whereby at least one communication path exists between said intelligent diagnostic console and each one of said plurality of processors.

8. The diagnostic system in accordance with claim 7, further comprising:
   a second intelligent diagnostic console for transmitting diagnostic commands and receiving diagnostic information; and
   a second first-level switching node connected by a dedicated diagnostic communication link to said second intelligent console and by first and second dedicated diagnostic links with said first first-level switching node;
   each one of said plurality of second-level switching nodes being connected by a corresponding dedicated diagnostic communication link with said second first-level switching node;
   whereby at least one communication path exists between said second intelligent diagnostic console and each one of said plurality of processors.

9. The diagnostic system in accordance with claim 8, further comprising:
   a plurality of third-level switching nodes, each one of said third-level switching nodes;
   each one of said second-level switching nodes being connected to a group of said third level switching nodes by corresponding dedicated diagnostic communication links; and
   each one of said third-level switching nodes being connected to a group of said processors by corresponding dedicated diagnostic communication links, each one of said groups of processors being a subset of said plurality of processors.

10. A diagnostic system for a plurality of processors, comprising:
    a first intelligent diagnostic console for transmitting diagnostic commands and receiving diagnostic information;
    a first tree network connecting said intelligent console with each one of said plurality of processors, comprising:
       a plurality of switching nodes, each one of said switching nodes being connected to a group of said processors by diagnostic communication links, each one of said groups of processors being a subset of said plurality of processors; and
       a first plurality of diagnostic communication links interconnecting said switching nodes;
       whereby at least one communication path exists between said intelligent diagnostic console and each one of said plurality of processors;
    a second intelligent diagnostic console for transmitting diagnostic commands and receiving diagnostic information; and
    a second tree network connecting said second intelligent console with each one of said plurality of processors, comprising:
       said plurality of switching nodes; and
       a second plurality of diagnostic communication links interconnecting said switching nodes;
       whereby at least one communication path exists between said second intelligent diagnostic console and each one of said plurality of processors.

11. The diagnostic system in accordance with claim 10, wherein:
    diagnostic messages are transmitted between said intelligent consoles and said switching nodes, between connected switching nodes, and between said switching nodes and said processors utilizing a message packeting protocol;
    said first and second intelligent consoles and each one of said plurality of processors include means for generating a diagnostic message packet; and
    each one of said switching nodes comprises a control processor and memory containing control software for reading and routing diagnostic message packets.

* * * * *